United States Patent [19]

Heisel et al.

[11] Patent Number: 4,764,192

[45] Date of Patent: Aug. 16, 1988

[54] SULFUR CONDENSER AND DEGASSER UNIT

[75] Inventors: Michael Heisel, Pullach; Reiner Lohmueller, Munich; Freimut Marold, Neubiberg, all of Fed. Rep. of Germany

[73] Assignee: Linde Aktiengesellschaft, Wiesbaden, Fed. Rep. of Germany

[21] Appl. No.: 889,565

[22] Filed: Jul. 25, 1986

[30] Foreign Application Priority Data

Jul. 25, 1985 [DE] Fed. Rep. of Germany ....... 3526680

[51] Int. Cl.⁴ ............................................. B01D 53/26
[52] U.S. Cl. ..................... 55/269; 165/111; 202/185 R; 202/185 D; 202/185.1; 202/185.5; 423/574 R; 423/578 R
[58] Field of Search ........................... 55/73, 267–269; 165/110, 111; 202/162, 198, 185.5, 185.1; 423/574 R, 578 R

[56] References Cited

U.S. PATENT DOCUMENTS

| | | | |
|---|---|---|---|
| 3,798,316 | 3/1974 | Beavon | 423/574 R |
| 4,242,111 | 12/1980 | Arends et al. | 55/269 |
| 4,249,921 | 2/1981 | Lell et al. | 55/269 |
| 4,332,596 | 6/1982 | Ranke et al. | 55/73 X |
| 4,414,004 | 11/1983 | Wagner et al. | 55/73 X |
| 4,419,337 | 12/1983 | Jagodzinski et al. | 423/574 R |
| 4,436,707 | 3/1984 | Karwat | 55/73 X |
| 4,522,256 | 6/1985 | Wolfseder | 165/111 X |

OTHER PUBLICATIONS

Chem. Eng. Techn. 58 (1986) No. 3, pp. 212–215.
Goddin et al., Hydrocarbon Processing, Oct. 1974, pp. 122–124.
Lagas, Hydrocarbon Processing, Oct. 1982, pp. 85–89.
Watson et al., Hydrocarbon Processing, May 1981, pp. 102–103.
Spiral-Wound Heat Exchangers Reactors, LINDE, 1 page (updated).
Tubular Heat Exchangers, LINDE, 2 pages, 1982.
Heisel et al., Sulphur 85 Preprints, pp. 133–150, Nov. 1985.

Primary Examiner—Charles Hart
Attorney, Agent, or Firm—Millen & White

[57] ABSTRACT

In a sulfur condenser and degasser system associated with a Claus furnace, the condenser comprises a wound cross-countercurrent heat exchanger. Liquid sulfur is passed into the top of the condenser as reflux so that ascending sulfur droplets can be coalesced and the condenser can act as a rectifying column. The degassing is preferably carried out substantially simultaneously with the formation of liquid sulfur.

11 Claims, 3 Drawing Sheets

SULFUR CONDENSER AND DEGASSER UNIT

BACKGROUND OF THE INVENTION

The invention relates to an apparatus for a sulfur condenser and degasser and an accompanying method for the effective condensing and degassing of sulfur.

DESCRIPTION OF THE PRIOR ART

The practice of recovering sulfur from a gaseous stream which is enriched with hydrogen sulfide has been carried out for a long time. This can be done, for example, by means of a sulfur recovery installation (Claus plant) based on the well known Claus reaction:

$$2\ H_2S + SO_2 \rightarrow 3/xS_x + 2\ H_2O + \Delta H$$

The gases containing $H_2S$ and $SO_2$ are catalytically reacted to sulfur in accordance with the above-mentioned reaction; if desired, in several stages; the sulfur is initially present in the vapor phase and is condensed out by cooling.

The cooling of the vapor-phase sulfur is usually conducted in a linear-tube heat exchanger wherein heat exchange takes place between a cooling medium and the sulfur-containing gas. Separation of the resultant liquid sulfur and the gas takes place in a downstream separator. The thus-separated sulfur is collected and degassed in a separate installation in order to drive out the dissolved $H_2S$, down to a tolerable residual content. For additional details, reference is invited to *Hydrocarbon Processing,* October 1982, pp. 88 to 89 or *Hydrocarbon Processing,* May 1981, pp. 102 to 103.

However, this prior art separation technique is relatively unsatisfactory. This is due, despite the use of baffles, to the high sulfur vapor pressure and to the presence of sulfur droplets. Moveover, degassing requires an additional installation which raises the initial inventment costs.

SUMMARY OF THE INVENTION

Accordingly, an object of one aspect of this invention is to provide a suitable apparatus and an accompanying process.

Another aspect of the invention is to provide a process wherein the heretofore separate process steps of cooling, separating, and degassing of the sulfur compounds can be performed together.

Upon further study of the specification and appended claims, further objects and advantages of this invention will become apparent to those skilled in the art.

These and other objects have been attained, in an apparatus aspect, by a sulfur condenser and degasser wherein the improvement comprises that said condenser and degasser is designed as a wound cross-countercurrent heat exchanger, synomously known as a wound cross-counterflow heat exchanger.

In a method aspect, the invention comprises a process for degassing sulfur in an improved sulfur condenser wherein said condenser is designed as a wound cross-countercurrent heat exchanger, and as a preferred feature, one or more of the following: maintaining a low $H_2S$ partial pressure in said condenser, setting a temperature gradient within the condenser so that the top of the condenser is cooler than the bottom of the condenser, and degassing the sulfur while the sulfur is being formed.

For a discussion of cross-counterflow heat exchangers, the following references are incorporated herein: *Linde Reports on Science and Technology,* Vol. 18, pages 35–40, W. H. Scholz, "Coiled Tubular Heat Exchangers".

The sulfur condenser fabricated according to this invention comprises a column incorporating the cross-countercurrent heat exchanger and preferably a reflux line in the top portion of the column. This means that the cooler winding, which can consist of one, or several, cooling coils wherein several cooling media can be utilized, possesses such a configuration that it creates the same effect as would several theoretical separating stages. This effect can easily be understood, if the cooling coil is considered as a regular packing. As on other packing, i.e., Pall rings, the droplets spread on the surface and form a very thin layer. The mass transfer of dissolved $H_2S$ to the gas phase can take place rapidly. On the other hand, sulfur from the gas phase can be transferred easily into the thin layer of liquid sulfur. Thus, the sulfur is condensed and can be recovered as degassed product sulfur.

The entrainment of sulfur droplets from the condenser, which has been a source of significant sulfur losses and, therefore, environmental pollution and/or the reason for expensive secondary purification operations, is minimal. One reason for this is because these droplets are captured by liquid sulfur dropping down from above. The liquid sulfur effects cooling and condensation. Cooling, since it comes from a cooler section of the condenser, and condensation of further sulfur, because it provides for condensation nuclei. Accordingly, the condenser functions in a similar fashion as the plates of a rectifying column, with the liquid sulfur here forming the bottoms product.

In an embodiment where as gas feed conduit enters the lower portion of the condenser and degasser incorporating a cross-countercurrent heat exchanger, and a gas discharge conduit is connected at the upper portion, and a drain for the liquid sulfur to be taken off is provided, the thus-condensed sulfur can be purified of $H_2S$ to a considerably greater extend, e.g., about 20 to 99% less $H_2S$ than possible with a conventional separator, due to the following reasons:

(1) The liquid sulfur containing $H_2S$ contacts a gas low in $H_2S$, e.g., about 2,000 to 10,000 ppm $H_2S$, so that $H_2S$ is degassed in correspondence with the low $H_2S$ partial pressure.

(2) The solubility of polysulfides of the formula $H_2S_x$ in sulfur does not obey the normal rules, i.e., at low temperatures their solubility is lower than at higher temperatures. Therefore, the $H_2S$ which is dissolved in the sulfur in the polysulfide form, will primarily degas in the upper, colder portion of the condenser. This effect is enhanced by a temperature profile within the condenser which increases as one goes from the top toward the bottom, thus creating a rectifier effect.

The average temperature in the lower section, i.e., the bottom half of the condenser is about 125° to 150° C. and the average temperature in the top half of the condenser is about 100° to 120° C. The bottom temperature is usually about 140° to 150° C. and the top temperature is usually about 115° to 120° C.

(3) Purely physically dissolved $H_2S$ is more soluble in sulfur at lower temperatures than at higher temperatures, as is usual for dissolved gases in liquids. Therefore, the degassing of $H_2S$ takes place predominantly in the lower section, which is the hotter portion of the condenser.

(4) Formation of the polysulfides $H_2S_x$ takes a certain amount of time, usually more than 10 minutes, before a significant formation occurs. Degasing of the polysulfides, on the other hand, is the part of the degassing operation which is particularly difficult. For this reason, degassing must be performed as quickly as possible so that the polysulfides cannot have time to form so that an acceptably low $H_2S$ residual content can be obtained in the sulfur. The rapid degassing is made possible by the arrangement of the degasser in the sulfur condenser, so that degassing is directly performed during formation of the liquid sulfur. Even sulfur from the front end of a Claus plant, i.e., from the waste heat reboiler downstream of the Claus burner, can flow to the tail end degasser within less than 5 minutes and is subsequently degassed. Within less than 10 minutes the total sulfur is degassed leaving no time for perceptible $H_2S_x$ formation.

The sulfur condenser and degasser of the invention permit a degassing of $H_2S$, and also $H_2S_x$, by the combination of the effects resulting from a lowering of the partial pressure, agitation, and the temperature gradient present; all without requiring a supply of external energy. The $H_2S$ partial pressure is lower at the tail end of the Claus plant than at the front end by a factor of approximately 10 to 50 due to sulfur formation according to the Claus reaction. Agitation is effected by bubbling Claus tail gas through the liquid sulfur of the bottom of the condenser. Agitation can be increased by pumping liquid sulfur from the sulfur collecting pit or from the degasser bottom itself to the top of the degasser.

In this process, degassing also takes place on the surface of the heat exchanger winding coils due to the effects resulting from the large surface area, agitation, and intermixing.

Thus, the sulfur condenser and degasser of this invention achieves both an improvement in the degree of sulfur separation, e.g., about 80 to 99.5% of sulfur vapor and droplets are removed, and also a degassing of the separated sulfur, while simultaneously rendering the process simpler and more economical.

Liquid sulfur is taken from a conduit and utilized at a suitable location as a reflux stream to the sulfur condenser and degasser. The liquid sulfur source can stem from, e.g., another part of the plant, and need not be degassed. However, this sulfur can also be taken from the product sulfur stream. In the latter case, the drain for liquid sulfur is connected with the feed conduit for liquid sulfur. By entering liquid sulfur at a suitable point, i.e., at a location corresponding to the temperature level and the gas composition, the rectifying effect and degassing of the sulfur are enhanced. The optimal point to feed in liquid sulfur is below the top of the condenser because the sulfur vapor degassing from liquid sulfur, according to thermodynamic equilibrium at feed temperature, has to be cooled and condensed before reaching the top of the condenser. Moreover, an additional amount of sulfur droplets can also be collected from the rising gas.

In embodiments where a portion of the product sulfur is utilized as the backflow stream, a sulfur circulation is created which enables additional degassing to occur. This is because usually the largest amount of the product sulfur formed in a Claus plant stems from the forward plant sections (if only one central degassing unit is provided), where high $H_2S$ concentrations are still ambient and, consequintly, high $H_2O$ concentrations are also present in the product sulfur, in correspondence with the high $H_2S$ partial pressure in these plant sections. In contrast, downstream of the Claus plant the $H_2S$ partial presure is low, so that the $H_2S$ is degassed from the product sulfur solely on the basis of the lowering in partial pressure which occurs. Additionally, the circulation also causess the polysulfides $H_2S_x$ which form during the course of time to again react to $H_2S$ and be degassed. For further details of the degassing which occurs in a Claus plant, reference is invited to the following references, incorporated herein: *Hydrocarbon Processing*, October 1974, pages 122 to 124; *Hydrocarbon Processing*, May 1981, pages 102 to 103; *Hydrocarbon Processing*, October 1982, pages 85 to 89.

In accordance with another embodiment, the sulfur condenser and degasser prossesses a catalytic or inert packing material, e.g., Claus catalyst CR by Rhone Poulenc, or Kaiser S201, or a Glitsch grid, or Sulzer packing or Pall rings. The packing serves to improve the number of theoretical plates in the above-described rectifying action of the condenser and degasser, just as in a packed distillation column as described before. At the same time, the probability of sulfur droplets becoming entrained in the pure gas stream is also additionally reduced.

Preferably, an entrainment separator (demister) of a knitted material or fabric is positioned in the upper portion of the sulfur condenser and degasser, by means of which the entrainment of sulfur droplets is likewise prevented. The entrainment separator preferably is a wire mesh made of stainless steel, with 97.5% void fraction, 330 $m^2/m^3$ surface area per volume.

The sulfur condenser and degasser apparatus can be employed in desulfurization plants. In this connection, it is advantageous to couple the sulfur condenser and degasser with a Claus reactor, the latter which can, e.g., be designed as an isothermal reactor.

In such a coupling embodiment, the hot Claus gas enters the Claus reactor from the bottom, instead of from the top, as is normal. On account of the exothermic character of the Claus reaction, the gas is heated up above the catalyst and thus also heats the bottom of the degasser, which is preferably thus located on top of the reactor. The purely physically dissolved $H_2S$ will degas—in contrast to the quasi-chemically bound polysulfides $H_2S_x$—on account of the heating, since the solubility of $H_2S$ decreases with increasing temperature. Any polysulfide ($H_2S_x$) that may have already formed and which exhibits a lower solubility at lower temperatures is driven out as described hereinabove, predominately at the upper portion of the condenser and degasser, where lower temperatures are prevalent.

If the Claus reactor is designed as an isothermal reactor, the coupling can be effected on the gas side and on the coolant side. Such an isothermal reactor is described in the following reference, incorporated herein: International Conference, Sulfur 85, London, November 10 to 13, R85, Preprint, page 143.

The coupling can be such that there is only heat transfer from the Claus reactor to the degasses through the common reactor wall (penultimate paragraph above, second sentence) and through the gas coming from Claus reactor to the degasses. In addition there can be coupling on the coolant side. Preferably, the coolant is warmed up in the condenser/degasser and then used as coolant in the Claus reactor, since the lowest temperature should be at the top of the condenser. Thus, it is possible, for example, to employ a single cooling medium for the isothermal Claus reactor and the sulfur condenser and degasser. The hot isothermal reactor can serve as the boiler for the bottom section of the sulfur condenser and degasser. Thus, the sulfur condenser and degasser and the isothermal reactor can also be arranged in a single vessel. In such a case, prefereably the isothermal reactor is positioned underneath the condenser and degasser, and gas flow takes place through the reactor, from the bottom toward the top.

The invention additionally relates to a process for degassing sulfur in a sulfur condenser and degasser. This process fulfills at least one and preferably all of the following conditions: in the sulfur condenser and degasser, a low, e.g., about 2 to 10 mmHg $H_2S$ partial pressure is maintained, a temperature gradient is set, and degassing of the sulfur is conducted while the latter is being produced. In a preferred embodiment, the liquid sulfur is withdrawn during this step and reintroduced as reflux. In this manner, sufficient time is made available for the $H_2S_x$ to degas, and the cool portio nof the condenser is predominantly employed for the degassing operation.

DETAILED DESCRIPTION OF THE DRAWINGS

Figure 1:
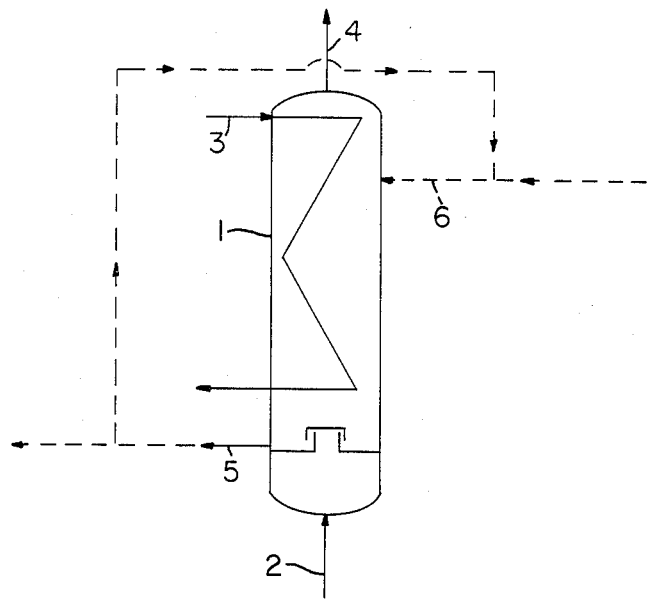
FIG. 1 is a simplified schematic drawing of the sulfur condenser and degasser.

Turning to the embodiment set forth in FIG. 1, the lower portion of a sulfur condenser and degasser 1 is charged, via conduit 2, with 119.18 mol/sec of a crude gas. The crude gas is maintained under a pressure of 1.6 bar and at a temperature of 180° C. and has the following composition:

| | |
|---|---|
| $N_2$ : | 18.13 mol-% |
| $CO_2$ | 72.34 mol-% |
| $H_2S$ | 0.55 mol-% |
| $SO_2$ | 0.28 mol-% |
| Sulfur ($S_8$) | 0.94 mol-% |
| $H_2O$ | 7.76 mol-% |

The sulfur condenser 1 is designed as a wound cross-countercurrent heat exchanger. The condenser comprises a cooling coil 3 traversed from the top toward the bottom by a cooling medium, e.g., boiler feed water. In other words, a cooling medium flows through the tube-side of the heat exchanger while crude gas flows through the shell-side. The amount of cooling medium affects the temperature gradient within the column. The head temperature is subjected to only minor fluctuations as long as an adequate heat exchanging surface is available.

Overhead, via conduit 4, 118.07 mol/sec of purified gas is withdrawn at a temperature of 118° C. The purified gas still possesses a residual sulfur content of 18 vppm.

Liquid sulfur is obtained in a quantity of 1.028 t/h via conduit 5. This product sulfur still has a residual $H_2S$ content of less than 10 vppm. In order to reduce this residual $H_2S$ content present in the product sulfur, as well as the residual sulfur content present in the pure gas, either product sulfur, or sulfur from another plant, can be introduced into the column via reflux or backflow line 6. By such a technique the entrainment of sulfur droplets in the pure gas is reduced and also the degassing of the liquid sulfur is improved.

Figure 3:
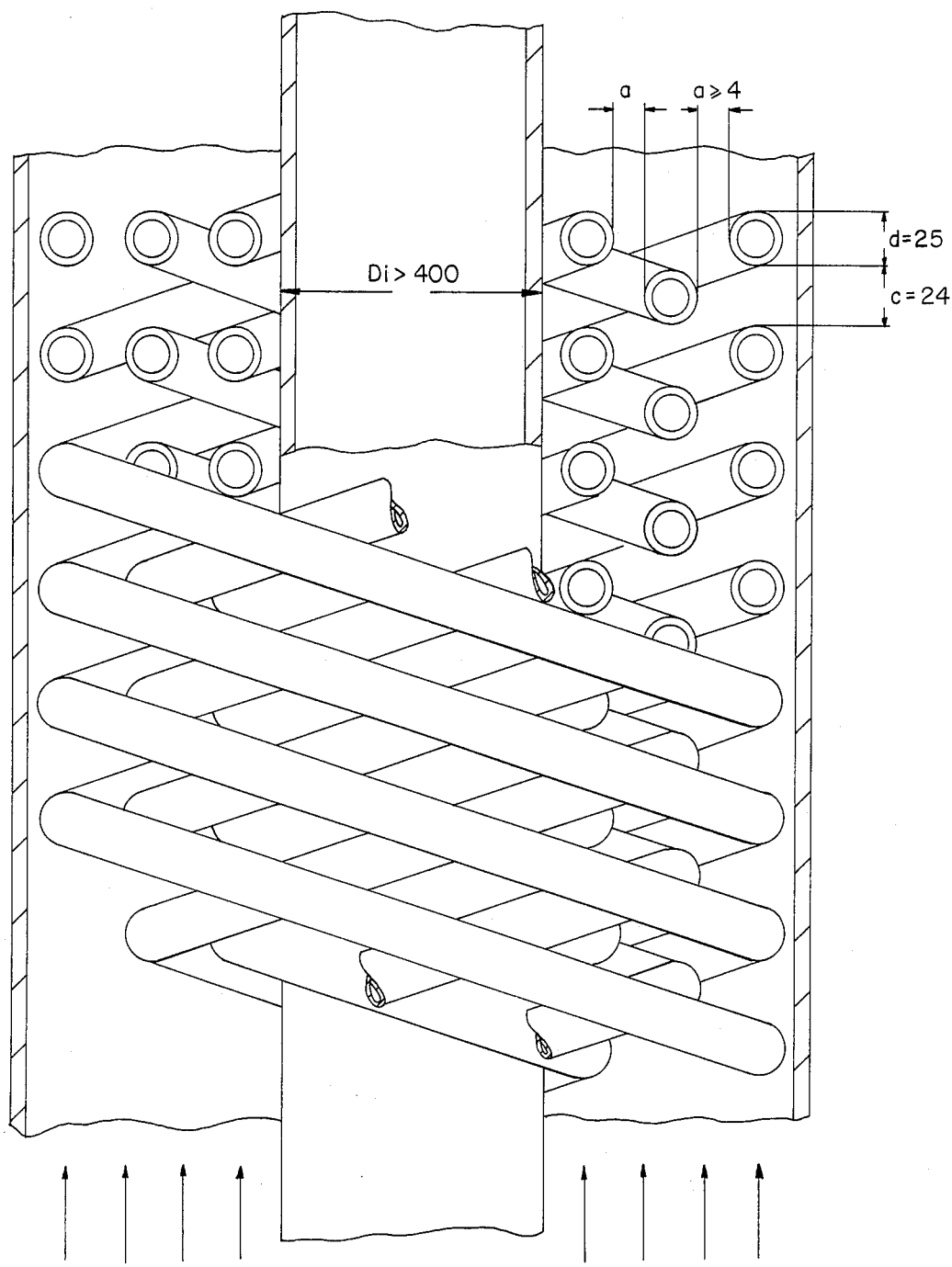
FIG. 3 is a schematic drawing of a tubular heat exchanger, also known as a wound crossflow or countercurrent heat exchanger.

In the above example, the wound cross coutercurrent heat exchanger was that depicted in FIG. 3. Outer diameter $D_o$, a and c depend greatly on gas flow rate. For example, given above, the respective dimensions are: $D_o=1.92$ m, $D_i=0.406$ m, $d=25$ mm, $c=10$ mm, $a=15$ mm, $H_c=5.07$ m ($H_c$=height of coil). In any case, a ratio of $H_c:D_o>2$ should be applied. However, in detail, the design has to be done on a case by case basic.

Figure 2:
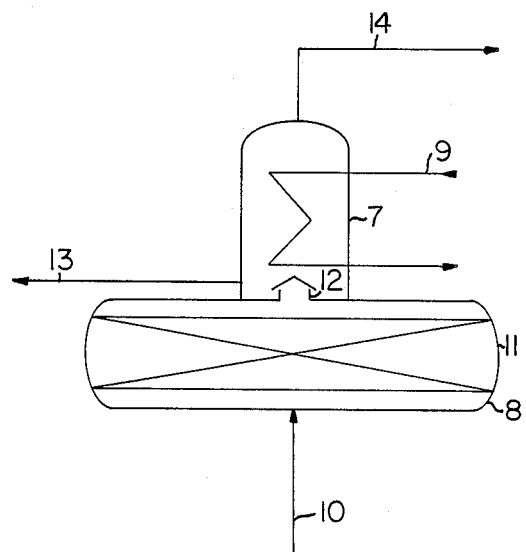
FIG. 2 is a simplified schematic drawing of the coupling of the sulfur condenser and degasser with a Claus reactor.

According to the embodiment set forth in FIG. 2, a sulfur condenser and degasser 7 is positioned on top of a Claus reactor 8. The sulfur condenser and degasser 7 has a cooling coil 9 which is traversed from the top toward the bottom by a cooling medium, e.g., boiler feed water. Claus gas enters, via a conduit 10, into the Claus reactor 8, which has a conventional catalyst packing 11. By utilization of the catalyst, for example, $Al_2O_3$, the Claus reaction takes place, during which heat is released and is then utilized for heating the lower portion of the sulfur condenser and degasser.

Figure 5:
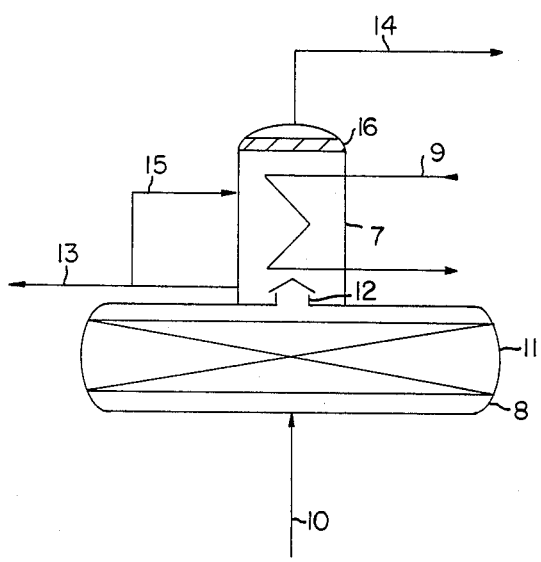
FIG. 5 is similar to FIG. 2 but wherein a demister is employed at the head of the condenser.

The reacted gas rises via a chimney plate 12 into the sulfur condenser and degasser 7 and is cooled to such an extent that liquid elemental sulfur is condensed out. The elemental sulfur is discharged via conduit 13. Purified gas exits from the sulfur condenser and degasser 7 overhead via conduit 14. In this embodiment a reflux line (15) can be incorporated as shown in FIG. 5, increasing the effect of degassing and capturing of sulfur droplets, as described previously. But the degasser/condenser can also be operated without that reflux.

Figure 4:
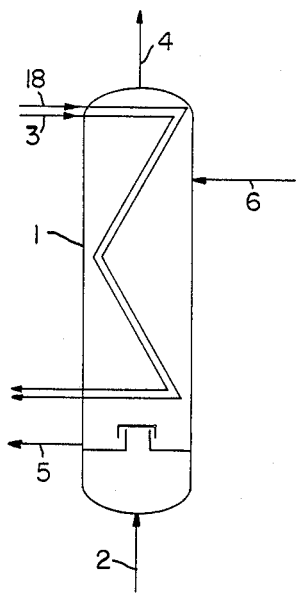
FIG. 4 is similar to FIG. 1 but wherein a second cooling coil is employed in the condenser.

In FIG. 4 a second cooling coil (18) is shown. This is combined with the first coil, as shown, e.g., in the Linde prospectus "Tubular heat exchangers" incorporated by reference herein. Such an embodiment is especially useful, when the condenser/degasser is installed downstream of a Claus reactor operated for a time below the sulfur dew point (see, e.g., *Hydrocarbon Processing*, October 1974, pages 122 to 124). During regeneration of the Claus reactor, the gas flows to the condenser with a higher temperature and, due to the evaporation of formerly liquid sulfur adsorbed on the Claus catalyst, also with a higher sulfur vapor load. Both result in a high cooling requirement in the condenser, which preferably is realized by a second cooling coil. Another possibility of carrying out the heat exchange in the condenser/degasser is to change the temperature difference between the cooling medium and the sulfur loaded gas. This can be achieved by varying the pressure of the coolant, if cooling is provided by evaporation. If water and steam are used, a typical pressure range would be between 1.5 and 5 bar, resulting in boiling temperatures in the cooling system between 111° and 150° C.

In FIG. 5, an additional demister 16 is shown. Such a demister is state of the art in sulfur condensers and generally comprises a pad or laminate, for example. It further reduces entrainment of sulfur in the purified gas especially in cases of malfunction or not optimal operation of the condenser. The demisters must be heated (by steam or another medium) to avoid sulfur blockages due to congealing sulfur droplets. In this embodiment, reflux line 15 is dashed to indicate it is optional.

Figure 6:
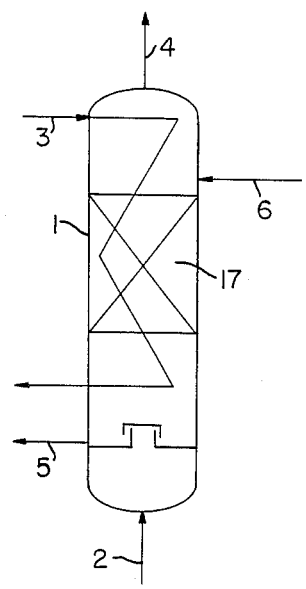
FIG. 6 is similar to FIG. 1 but wherein packing of an inert or catalytic material is employed in the condenser.

In FIG. 6, an additional packing of inert of catalytically active material is shown. Reactors in which a cooling coil is immersed in a catalyst bed are described, e.g., in Chem. Eng. Techn., Vol. 58 (1986), No. 3, pages 212 to 215. In the same way, inert packing material can be filled into the cooling coil. The effect of the heat exchanger coil for heat and mass transfer, as described previously, is increased by the additional packing by spreading the liquid sulfur flowing downward over a greater area, thus increasing the mass transfer area and decreasing the thickness of the sulfur film. The additional advantage of using a catalyst is that part of the residual $H_2S$ and $SO_2$ in the Claus off-gas reacts and forms additional elemental sulfur, which is eventually recovered, thus further decreasing the emission of sulfur compounds to the atmosphere.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a sulfur condenser and degasser apparatus, the improvement wherein the condenser comprises a column incorporating a cross-countercurrent heat exchanger, conduit means (6) for introducing liquid sulfur into the top portion of the column and means for draining liquid sulfur (5, 13) connected to the column, said conduit means (6) being in fluid communication with the liquid sulfur draining means (5, 13) whereby liquid sulfur is withdrawn from the column by said draining means (5, 13) and introduced to the column as reflux via conduit means (6).

2. A sulfur condenser and degasser according to claim 1, wherein a conduit means for feeding gases (2) is connected to the lower portion of the column and a conduit means for discharging gases (4, 14) is connected at the upper portion of the column.

3. A sulfur condenser and degasser according to claim 1, wherein conduit means (6) is in fluid communication with an external source of liquid sulfur.

4. A sulfur condenser and degasser according to claim 2, wherein conduits means (6) is in fluid communicationwith an external source of liquid sulfur.

5. A sulfur condenser and degasser according to claim 1 further comprising catalytic or inert packing 6. A sulfur condenser and degasser according to claim 1, said condenser and degasser further comprising wire mash entrainment separator means with the upper portion thereof.

7. A sulfur condenser and degasser according to claim 1, further comprising separated cooling coil means for utilizing different cooling fluids.

8. A sulfur condenser and degasser according to claim 1 wherein a temperature gradient increases from the upper to the lower portion during operation.

9. A sulfur condenser and degasser according to claim 1, further comprising means for delivering a cooling fluid to the tube-side of said heat exchanger and means for delivering a sulfur-containing gas to the shell-side of said heat exchanger.

10. A sulfur condenser and degasser according to claim 9, wherein conduit means (6) is in fluid communication with the shell-side of said heat exchanger.

11. A sulfur condenser and degasser in combination with a Claus plant, comprising a sulfur condenser and degasser according to claim 9 and a Claus plant in fluid communication with said means for delivering a sulfur-containing gas.

* * * * *